(12) United States Patent
Masuda et al.

(10) Patent No.: US 10,370,880 B2
(45) Date of Patent: Aug. 6, 2019

(54) LOCKING DEVICE FOR OPENING AND CLOSING LID

(71) Applicant: KABUSHIKI KAISHA AUDIO-TECHNICA, Machida-shi, Tokyo (JP)

(72) Inventors: Akira Masuda, Machida (JP); Hideyuki Matsuura, Machida (JP); Yoshihiko Naito, Machida (JP)

(73) Assignee: KABUSHIKI KAISHA AUDIO-TECHNICA, Machida-Shi, Tokyo (JP)

( * ) Notice: Subject to any disclaimer, the term of this patent is extended or adjusted under 35 U.S.C. 154(b) by 764 days.

(21) Appl. No.: 14/926,798

(22) Filed: Oct. 29, 2015

(65) Prior Publication Data

US 2016/0143166 A1     May 19, 2016

(30) Foreign Application Priority Data

Nov. 14, 2014    (JP) .................................. 2014-231939

(51) Int. Cl.
     *E05C 1/10*          (2006.01)
     *E05B 63/14*       (2006.01)
     (Continued)

(52) U.S. Cl.
     CPC .............. *E05C 1/10* (2013.01); *E05B 63/143* (2013.01); *E05C 19/006* (2013.01); *E05B 65/006* (2013.01); *H01M 2/1022* (2013.01)

(58) Field of Classification Search
     CPC ............. H04M 1/0262; H04M 1/0214; H04M 1/0249; E05C 9/02; E05B 65/006;
     (Continued)

(56) References Cited

U.S. PATENT DOCUMENTS

| RE26,181 | E | * | 4/1967 | Harvey | .................. G03B 17/02 242/340 |
| 3,432,967 | A | * | 3/1969 | Horst | ..................... G03B 17/02 220/326 |

(Continued)

FOREIGN PATENT DOCUMENTS

| JP | H08-45490 A | 2/1996 |
| JP | H11-25941 A | 1/1999 |

(Continued)

OTHER PUBLICATIONS

Japan Patent Office, "Office Action for Japanese Patent Application No. 2014-231939," dated Jul. 17, 2018.

*Primary Examiner* — Mark A Williams
(74) *Attorney, Agent, or Firm* — Manabu Kanesaka

(57) ABSTRACT

A main body case is provided with an opening and closing lid supported in an openable and closable manner by a spindle at one end portion thereof as well as slidably attached in a direction orthogonal to a length direction of the spindle; a pair of unlocking knobs slidably arranged along a front surface of the opening and closing lid; and a locking portion formed on a main body case side that puts the opening and closing lid in a locked state by locking a step portion on a free end portion side of the opening and closing lid by sliding operating the opening and closing lid in one direction in a state where the opening and closing lid is closed.

2 Claims, 10 Drawing Sheets

(51) Int. Cl.
*E05C 19/00* (2006.01)
*E05B 65/00* (2006.01)
*H01M 2/10* (2006.01)

(58) Field of Classification Search
CPC .......... E05B 17/2069; Y10T 292/0936; Y10T 292/1001; Y10T 292/0807; Y10T 292/0878; Y10T 292/0956; Y10T 292/1028; G06F 1/1679
USPC ........................................................ 292/137
See application file for complete search history.

(56) References Cited

U.S. PATENT DOCUMENTS

| | | | |
|---|---|---|---|
| 7,058,295 B2 | 6/2006 | Nishiwaki | |
| 8,241,783 B2 | 8/2012 | Tsuji | |
| 8,322,760 B2* | 12/2012 | Wu | E05B 65/006 292/137 |
| 8,556,303 B2* | 10/2013 | Rajagopal | E05C 3/122 292/11 |
| 9,101,086 B2* | 8/2015 | Huang | H05K 5/0239 |
| 2003/0001395 A1* | 1/2003 | Barthelet | E05B 15/0053 292/175 |
| 2007/0205208 A1* | 9/2007 | Ueda | G03B 17/02 220/813 |
| 2010/0062324 A1* | 3/2010 | Ooyama | H01M 2/0404 429/97 |
| 2012/0050963 A1* | 3/2012 | Chen | H01M 2/1066 361/679.01 |
| 2012/0087071 A1* | 4/2012 | Yang | E05C 1/04 361/679.01 |
| 2013/0141637 A1* | 6/2013 | Kaga | E06B 7/22 348/373 |
| 2013/0163221 A1* | 6/2013 | Obana | H05K 5/0247 361/826 |

FOREIGN PATENT DOCUMENTS

| | | |
|---|---|---|
| JP | 2003-257395 A | 9/2003 |
| JP | 2004-022998 A | 1/2004 |
| JP | 2004-247218 A | 9/2004 |
| JP | 2008-181767 A | 8/2008 |
| JP | 2011-70485 A | 4/2011 |

\* cited by examiner

LOCKING DEVICE FOR OPENING AND CLOSING LID

RELATED APPLICATIONS

The present application is based on, and claims priority from, Japanese Application No. JP2014-231939 filed Nov. 14, 2014, the disclosure of which is hereby incorporated by reference herein in its entirety.

BACKGROUND OF THE INVENTION

Field of the Invention

The present invention relates to a locking device for an opening and closing lid that covers, for example, a battery housing unit of a portable electronic device and the like.

Description of the Related Art

A portable electronic device is provided with a battery housing unit, which is apart of a case main body. In the battery housing unit, a dry battery or a storage battery is housed, and it is used as an operation power supply for the device.

The battery housing unit is also provided with an opening and closing lid that covers the housed dry battery or the like. One end portion of the opening and closing lid is pivotally supported to the case main body by a hinge mechanism. Then, on a free end side of the other end portion of the opening and closing lid, there is provided a locking device capable of locking in a state where the opening and closing lid is closed relative to the case main body.

As the above-described locking device for the battery opening and closing lid, a basic configuration may be exemplified in which a lock claw is formed on an opening and closing lid side and an engagement hole with which the lock claw engages is provided on a case side. According to this configuration, by the lock claw on the opening and closing lid side moving and fitting into the engagement hole on the case side, the locking device is locked in a state where the opening and closing lid is closed. Furthermore, by pulling opening the free end side where the lock claw is formed with a little force, the lock claw is moved and disengaged from the engagement hole on the case side, whereby a locked state can be released.

The above-described configuration of the locking device for the battery opening and closing lid is disclosed, for example, in JP 8-45490 A.

According to the locking device for the opening and closing lid, locking of the opening and closing lid is easily disengaged by applying a relatively small shock, vibration, and the like to the case main body or to the opening and closing lid. Accordingly, a battery may drop off from the battery housing unit and may cause inoperability of the electronic device.

Thus, in JP 11-25941 A, there is disclosed a locking device for the battery opening and closing lid in which a lock lever provided with a lock claw is slidably installed in the opening and closing lid, and a coil spring for holding the locked state is provided to the lock lever.

In the locking device for the opening and closing lid disclosed in JP 11-25941 A, a release knob is integrally formed to the lock lever, and the release knob is arranged so as to project above the opening and closing lid.

Thus, by operating the release knob, it is possible to slide the lock lever and perform unlocking of the opening and closing lid, whereby it is possible to improve operability of the unlocking.

Then, according to the opening and closing lid disclosed in JP 11-25941 A, a configuration is used in which the lock lever is energized in one direction (direction in which the lock claw abuts on a cabinet main body side) by the above-described coil spring. Thus, compared to the locking device for the opening and closing lid disclosed in JP 8-45490 A, it is possible to improve a problem in that the locked state of the opening and closing lid is easily disengaged.

Now, a transmitter of a wireless microphone system may be exemplified as a portable electronic device operating on a dry battery and the like. The transmitter is frequently used, for example, as a means for amplifying voice on a stage, in a studio, and the like. Since it is installed in a waist belt of a performer when used, it is sometimes called a belt pack transmitter.

Then, in a case where the performer performs a play with a relatively strenuous movement and the like in a state where the above-described transmitter is installed in the waist belt, for example, there is often a problem in that a battery lid of the transmitter opens in an unexpected state and a battery may drop off. Naturally, such dropping off of the battery makes amplification of the voice of the performer impossible.

Thus, there has been proposed a configuration in which ingenuity is used so as to provide the lock lever disclosed in JP 11-25941 A dually and to release the battery lid when two lock levers are slid. However, as disclosed in JP 11-25941 A, in a structure where a reaction force of a contact point of a coil spring holding holds the battery is applied to inside of the battery lid, for some reason, the battery lid may be held in a tilted and floating state while one lock lever is in an unlocked state. In this case, a problem may arise in that the battery lid opens in a moment any force acts on the other lock lever. Besides the structure in which the reaction force of the contact point of the coil spring is applied, the battery may also be swung by the strenuous movement. At this time, in a case where a rapid motion occurs in a direction where the battery pushes open the lid, the battery lid opens and the battery jumps out due to various causes such as inertia force acting on the battery and collision between the battery lid and the battery.

Thus, even in a case where the lock levers are provided dually as described above, the problem arises in that the battery lid carelessly opens, whereby further ingenuity is required to improve reliability of the locking device for the opening and closing lid.

SUMMARY OF THE INVENTION

The present invention has been devised to resolve the above-described problem existing in the conventional locking device for the opening and closing lid, and the unlocking of the opening and closing lid is enabled by combining sliding operation of a pair of unlocking knobs with sliding operation of the entire opening and closing lid.

Accordingly, it is possible to prevent careless opening of the opening and closing lid as well as to provide the locking device for the opening and closing lid having good operability in locking operation and unlocking operation of the opening and closing lid.

To achieve the above-described problem, the locking device for the opening and closing lid according to the present invention is provided with: an opening and closing lid supported to be openable and closable by a spindle at one end portion thereof as well as slidably attached to one side surface of a main body case in a direction orthogonal to a length direction of the spindle; an unlocking knob slidably arranged along a front surface of the opening and closing lid; and a locking portion formed on a main body case side and configured to put the opening and closing lid in a locked state by locking a free end portion side of the opening and closing lid by sliding operating the opening and closing lid in one direction in a state where the opening and closing lid is closed. By sliding operating the unlocking knob in the locked state of the opening and closing lid, sliding operation of the opening and closing lid in another direction is enabled, and the opening and closing lid is unlocked.

In this case, preferably, a sliding direction of the unlocking knob and a sliding direction of the opening and closing lid are set to be in an orthogonal relationship.

Furthermore, the opening and closing lid is supported to be openable and closable by the spindle at one end portion thereof in a direction along a circumference with a radius being a length in a sliding direction.

Then, it is preferred that the opening and closing lid be provided with a spring that energizes the unlocking knob outward of the opening and closing lid.

It is also preferred that two protrusions be formed on a surface of the unlocking knob. A first protrusion is arranged such that a finger may be hooked in the sliding direction of the unlocking knob, and a second protrusion is arranged such that the finger may be hooked in the sliding direction of the opening and closing lid.

Furthermore, it is also possible to use a configuration in which one protrusion is formed on the surface of the unlocking knob. Preferably, the protrusion is constituted of a linear protrusion tilting outward from a center of the main body case.

Then, two unlocking knobs are provided. In this case, preferably, the sliding direction of the unlocking knob is set in an opposing direction to each other.

Furthermore, in a preferred embodiment, the first protrusion and the second protrusion are arranged to be orthogonal to each other at end portions thereof, and the first protrusion and the second protrusion of the unlocking knob positioned on the right side forms an L shape while the first protrusion and the second protrusion of the unlocking knob positioned on the left side forms a laterally-inverted reverse L shape.

Also, as the locking portion formed on the main body case side that locks the free end portion side of the opening and closing lid and puts the opening and closing lid in the locked state, an inner surface of an opening edge formed in the main body case can be suitably used.

In addition, in the locking device for the opening and closing lid according to the present invention, it is configured such that on a back surface of a pair of the unlocking knobs in a state where the opening and closing lid is closed, knob guides each provided with a prism-shaped protrusion is arranged on the main body case sides, respectively, and a side surface of a projection pin formed so as to project to the back surface of the unlocking knob is configured to position along any of the two orthogonal side surfaces of the prism-shaped protrusion formed in each of the knob guides. A configuration is used in which sliding operation of the opening and closing lid is enabled when each of the projection pins positions along a first side surface formed in the prism-shaped protrusion, and the sliding operation of the opening and closing lid is disabled when each of the projection pins positions respectively along a second side surface formed in the prism-shaped protrusion.

In this case, preferably, it is configured such that in a case where the opening and closing lid is closed, a tip portion of each of the projection pins formed so as to project to the back surface of the pair of the unlocking knobs abuts on a tip portion of the prism-shaped protrusion provided to each of the knob guides. A configuration is used in which a tilted surface where the projection pin of the unlocking knob is dropped along the first side surface of the prism-shaped protrusion is formed in the tip portion of the prism-shaped protrusion provided to each of the knob guides.

According to the locking device for the opening and closing lid having the above-described configuration, in a case where the opening and closing lid is closed and is in the locked state, it is possible to made the opening and closing lid slidable by sliding the unlocking knob arranged on the opening and closing lid inside.

By sliding the opening and closing lid in the direction orthogonal to the sliding direction of the unlocking knob in this state, it is possible to disengage the free end portion side of the opening and closing lid from the locking portion on the main body case side. Accordingly, it is possible to release the opening and closing lid from the locked state.

That is, according to the locking device for the opening and closing lid of the present invention, by combining the sliding operation of the unlocking knob with the sliding operation of the entire opening and closing lid, the unlocking of the opening and closing lid becomes possible. Thus, to release the locked state of the opening and closing lid, the sliding operation in a two-dimensional direction of a transverse direction and a longitudinal direction accompanies, whereby it is possible to resolve a problem in that locking of the opening and closing lid is disengaged carelessly during use of the electronic device and, for example, a dry battery and the like drops off.

Furthermore, the locking operation and the unlocking operation of the opening and closing lid are relatively simple. Thus, it is possible to provide the locking device for the opening and closing lid having good operability such as it is possible to repeat the same operation without hesitation and the like by learning the locking operation and the unlocking operation only once.

DESCRIPTION OF THE PREFERRED EMBODIMENTS

A locking device for an opening and closing lid according to the present invention is described based on an example in which it is applied to a transmitter of a wireless microphone system.

Figure 1:
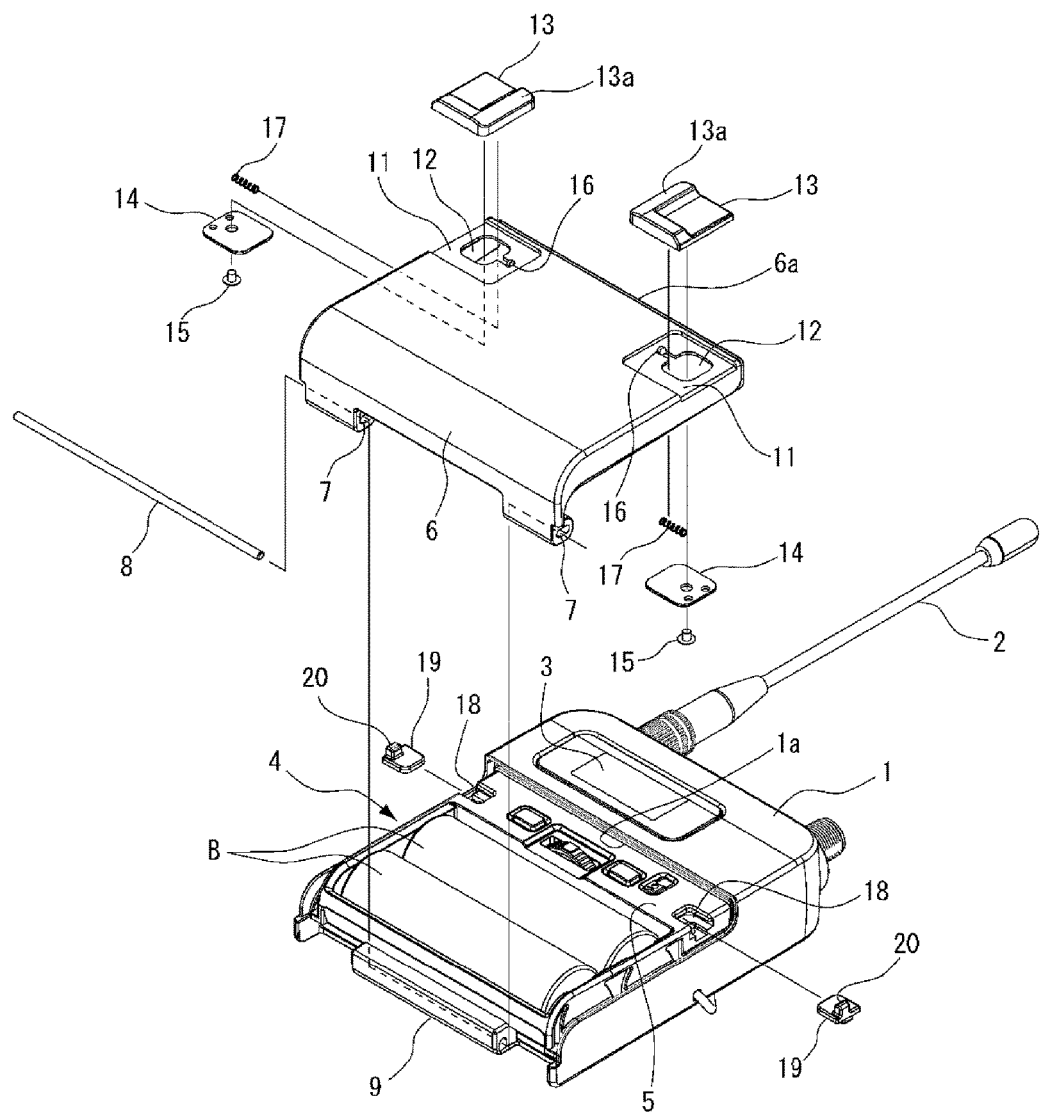
FIG. 1 is an exploded perspective view illustrating an overall configuration of an electronic device provided with a locking device for an opening and closing lid according to the present invention.

As illustrated in FIG. 1, a main body case 1 constituting a contour of the transmitter is formed into a flat rectangular parallelepiped shape entirely, and a transmission antenna 2 for a voice signal is attached to an upper end portion thereof. A display 3 is installed in a front surface top portion of the main body case 1, and an opening 4 is formed so as to occupy large part of a case front surface on a lower side of the display 3.

Then, there is a housing chamber for a dry battery B in the opening 4, and an interior member 5 in which an operation button and the like are disposed is arranged.

There is provided an opening and closing lid 6 capable of blocking the opening 4, which is formed on the front surface of the main body case 1. A pair of axis holes 7 is formed to this opening and closing lid 6 at both sides of a lower end portion thereof. By a spindle 8 inserted into the pair of the axis holes 7, the opening and closing lid 6 is turnably supported.

Then, the spindle 8 is attached to the main body case 1 by being installed to a spindle holder 9 formed along a lower end portion of the main body case 1.

Note that the pair of the axis holes 7 formed in the lower end portion of the opening and closing lid 6 is formed into a long hole shape in which the axis hole is spread in a groove shape along a vertical direction of the opening and closing lid 6. That is, each of the pair of the axis holes 7 is formed into the long hole shape, whereby the opening and closing lid 6 is attached to the spindle 8 so as to be vertically slidable along a front surface of opening and closing lid 6, or in a direction orthogonal to a length direction of the spindle.

Then, a thin step portion 6a is linearly formed on a free end portion side, which is the upper end portion of the opening and closing lid 6. It is configured such that when the opening and closing lid 6 is slid upward in a state where the opening and closing lid 6 is closed, the thin step portion 6a enters into an inner surface 1a of a top portion opening edge formed on a side of them in body case 1.

That is, as described below, the inner surface 1a of the top portion opening edge formed on the main body case 1 functions as a locking portion that locks the free end portion side of the opening and closing lid 6 and makes the opening and closing lid 6 in a locked state (denoted with the same reference numeral as the inner surface 1a of the opening edge).

There is formed a pair of quadrilateral-shaped recessed portions 11 to the right and left near the upper end portion of the opening and closing lid 6, and at a center of each of the pair of the recessed portions 11, a through hole 12 is formed. Then, an unlocking knob 13 formed into a substantially square shape is attached to each of the pair of the recessed portions 11 from a front surface side of the opening and closing lid 6.

On a back surface side through the opening and closing lid 6 where the unlocking knob 13 is positioned, slide plates 14 formed into a substantially square shape is arranged. Then, each of the slide plates 14 is joined to the unlocking knob 13 by a screw 15 to be installed from the back surface side of each of the slide plates 14.

In this configuration, the pair of the unlocking knobs 13 is attached to the opening and closing lid 6 so as to be slidable only in a width direction of the opening and closing lid 6 along the pair of the quadrilateral-shaped recessed portions 11. Thus, a sliding direction of the pair of the unlocking knobs 13 and a sliding direction of the opening and closing lid 6 are set to be in an orthogonal relationship.

Subsequent to the pair of the through holes 12 formed between the unlocking knob 13 and the slide plate 14, toward a central part side of the opening and closing lid 6, a groove hole is each formed. To an edge portion of the groove hole, a small protrusion 16 is formed respectively. One end portion of a coil spring 17 is attached to the small protrusion 16, and it is housed in the groove hole. Then, the other end portion of each of the coil springs 17 abuts on apart of a back surface of each of the unlocking knobs 13 and gives to the pair of unlocking knobs 13 an energizing force toward both outsides of the opening and closing lid 6.

Note that, among the pair of the unlocking knobs 13, on a surface of the unlocking knob positioned on the right side in a front view, by a first protrusion projecting in a vertical direction and a second protrusion projecting in a horizontal direction, a protrusion 13a projected in an L-shape for engaging a finger is formed, and on a surface of the unlocking knob positioned on the left side, the protrusion 13a projected in a reverse L-shape, in which the right and left are reversed, for engaging a finger is formed.

In performing unlocking of the opening and closing lid 6 in the locked state, this can contribute to improving operability of sliding operation toward a central part side of the pair of the right and left unlocking knobs 13 and sliding operation toward a lower side of the opening and closing lid 6.

On the other hand, on the both sides of the interior member 5 arranged within the opening 4 of the main body case 1, there is formed a pair of recessed portions 18 provided with a cutting groove from both outsides toward a central part thereof. Then, to the pair of the recessed portions 18, a knob guide 19 is attached being installed from the both sides of the interior member 5.

The knob guide 19 is constituted of a prism-shaped protrusion 20 integrally formed to a front surface of a plate-like member. By the plate-like member being inserted into the cutting groove, the knob guide 19 is installed in and fixed to the recessed portions 18.

Note that the knob guide 19 is configured to position on a back side of the unlocking knob 13 attached to the opening and closing lid 6 when the opening and closing lid 6 is closed with the spindle 8 as a rotation center.

FIGS. 2 to 5 illustrates the locking device for the opening and closing lid configured as above illustrating a process from a state where the opening and closing lid 6 is open to a locked state where the opening and closing lid 6 is closed in order.

Hereinafter, a function of the locking device for the opening and closing lid is described with reference to FIGS. 6A, 6B, 6C, 7A, 7B, 7C, 8A, 8B, 8C, 9A, 9B, and 9C illustrating a principal part of the locking device.

Note that in FIGS. 2 to 5 described below, only major members among members appearing in the drawing are denoted by the same reference numeral as in FIG. 1.

Figure 6A:
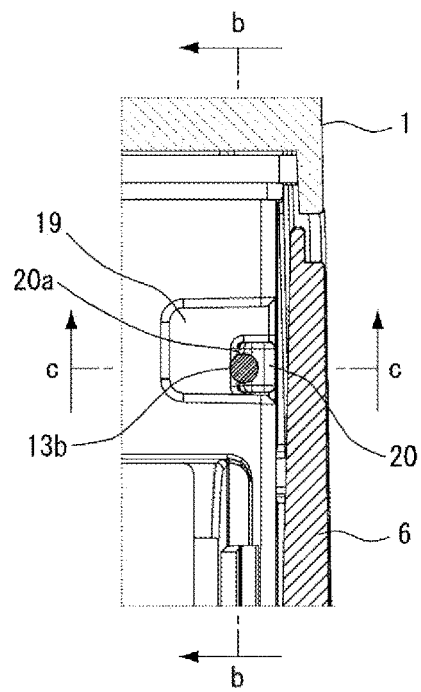
FIGS. 6A to 6C are sectional views illustrating a principal part in a first phase of locking the opening and closing lid viewed from three viewpoints.

Furthermore, FIG. 6A is a sectional view in a position just before the knob guide 19 on the back surface side of the opening and closing lid 6 in a state where the opening and closing lid 6 is closed. This is the sectional view in a state viewed in an arrow direction from line a-a in FIG. 6B. This is the same in FIGS. 7A, 8A, and 9A.

Figure 6B:
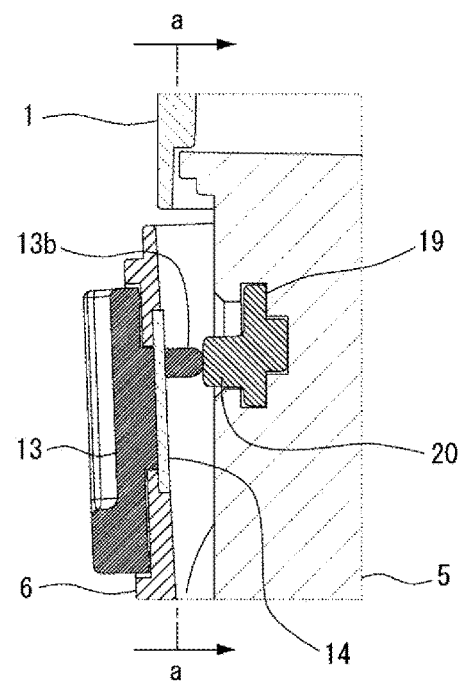

Furthermore, FIG. 6B is a vertical sectional view illustrating the central part of the unlocking knob 13 in a state where the opening and closing lid 6 is closed. This is the sectional view in a state viewed in the arrow direction from line b-b in FIG. 6A. This is the same in FIGS. 7B, 8B, and 9B.

Figure 6C:
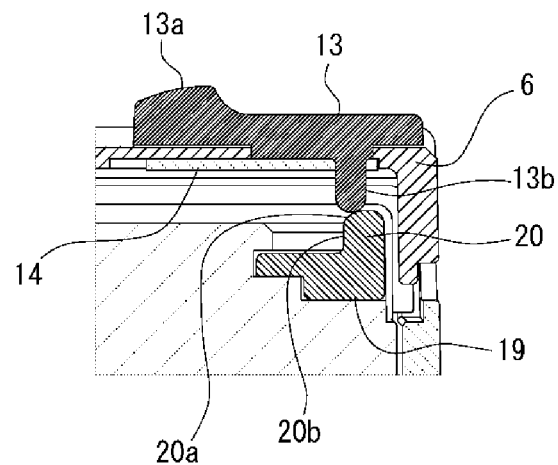

Furthermore, FIG. 6C is a horizontal sectional view illustrating the central part of the unlocking knob 13 in a state where the opening and closing lid 6 is closed. This is the sectional view in a state viewed in the arrow direction from line c-c in FIG. 6A. This is the same in FIGS. 7C, 8C, and 9C.

Note that FIGS. 6A, 6B, 6C, 7A, 7B, 7C, 8A, 8B, 8C, 9A, 9B, and 9C illustrate movement of the locking device implemented to the unlocking knob 13 arranged on the right side; however, the locking device implemented to the unlocking knob 13 arranged on the left side operates bilaterally symmetric to this, whereby illustration is omitted.

Figure 2:
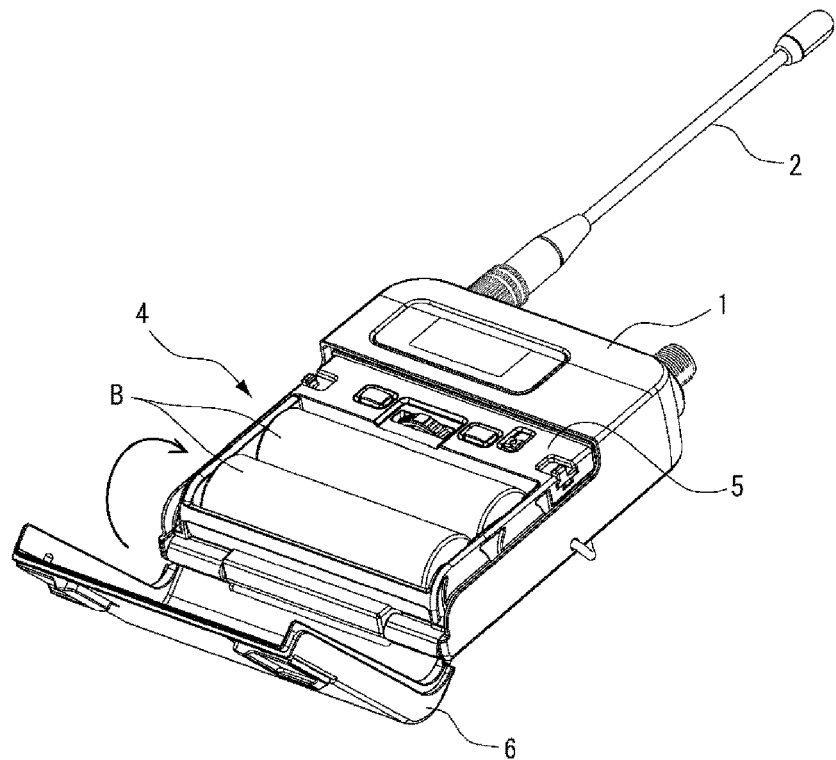
FIG. 2 is a perspective view of the electronic device in a state where the opening and closing lid is opened.
Figure 3:
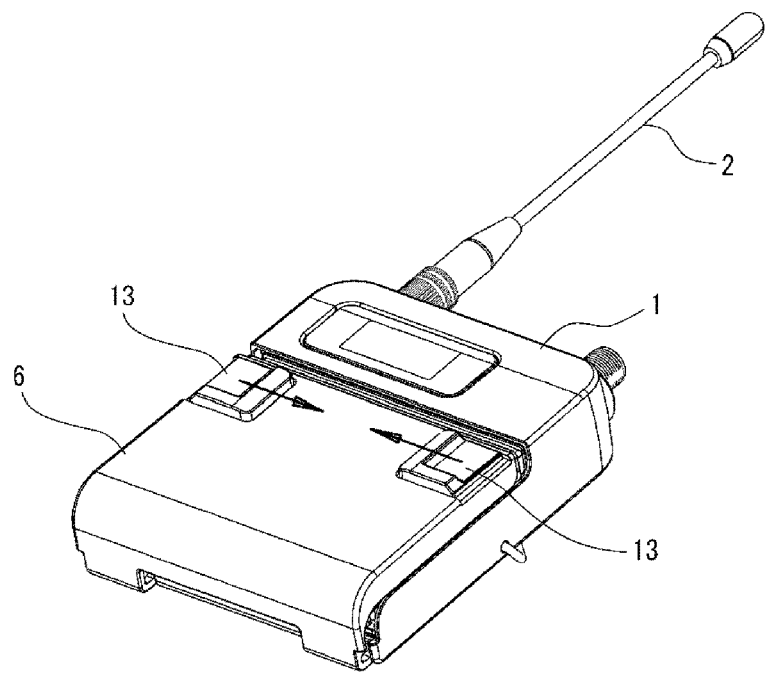
FIG. 3 is a perspective view of the electronic device in a state where the opening and closing lid is closed and lightly pushed.

First, in a case where the opening and closing lid 6 is closed, as illustrated in FIG. 2, the free end portion side of the opening and closing lid 6 is rotated in a direction illustrated with a circular arc arrow mark. Accordingly, as illustrated in FIG. 3, the opening and closing lid 6 blocks the opening 4 formed on a front surface of the main body case 1.

A state of the locking device at this time is illustrated in FIGS. 6A, 6B, and 6C. Note that as illustrated in FIGS. 6A, 6B, and 6C, on the back surface of the unlocking knob 13, a cylindrical projection pin 13b having a tip portion formed into a hemispherical shape is integrally formed with the unlocking knob 13.

Thus, by closing the opening and closing lid 6, the tip portion of the projection pin 13b formed on the back surface of the unlocking knob 13 abuts on an upper end portion of the prism-shaped protrusion 20 formed on the above-described knob guide 19.

To the upper end portion of the prism-shaped protrusion 20, as illustrated in FIGS. 6A and 6C, a tilted surface 20a is formed. The hemispherical tip portion of the projection pin 13b formed in the unlocking knob 13 is in a state of being abutted on the tilted surface 20a of the prism-shaped protrusion 20.

In this state, as illustrated in FIG. 3, when the front surface of the closed opening and closing lid 6 is lightly pushed in, the tip portion of the projection pin 13b slips on the tilted surface 20a and drops along a first side surface 20b of the prism-shaped protrusion 20. This is illustrated in FIGS. 7A and 7C with an arrow mark.

Thus, as illustrated in FIG. 3, the pair of unlocking knobs 13 attached on the front surface of the opening and closing lid 6 mutually slides inward.

Figure 7A:
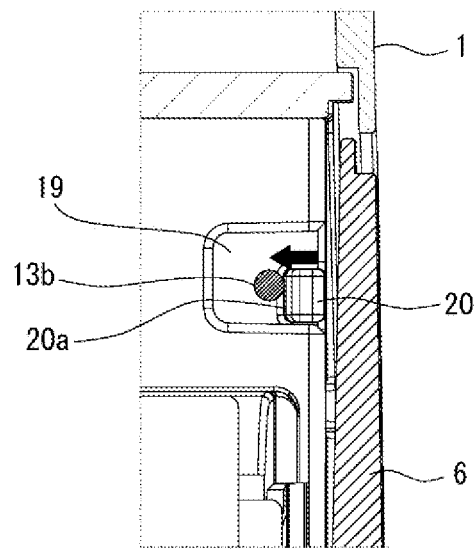
FIG. 7A to 7C is a sectional view illustrating the principal part in a second phase in the same way viewed from three viewpoints.
Figure 7B:
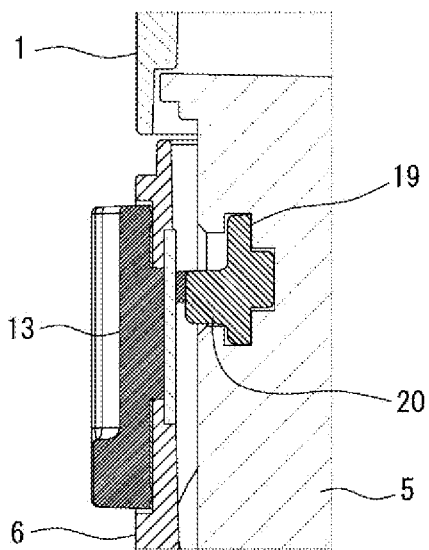
Figure 7C:
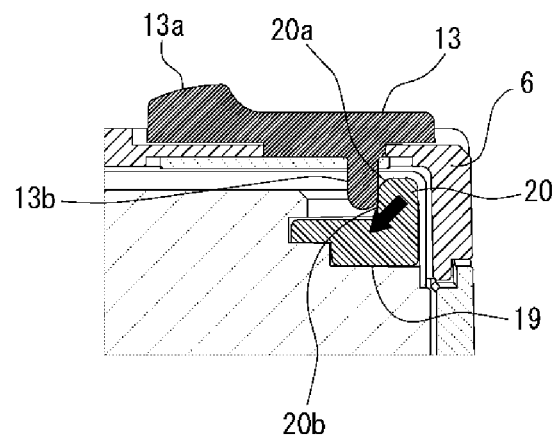

In this state, as illustrated in FIGS. 7A, 7B, and 7C, the projection pin 13b of the unlocking knob 13 is abutted on the first side surface 20b of the prism-shaped protrusion 20, and the first side surface 20b of the prism-shaped protrusion 20 is also formed along a vertical direction of the main body case 1.

Figure 4:
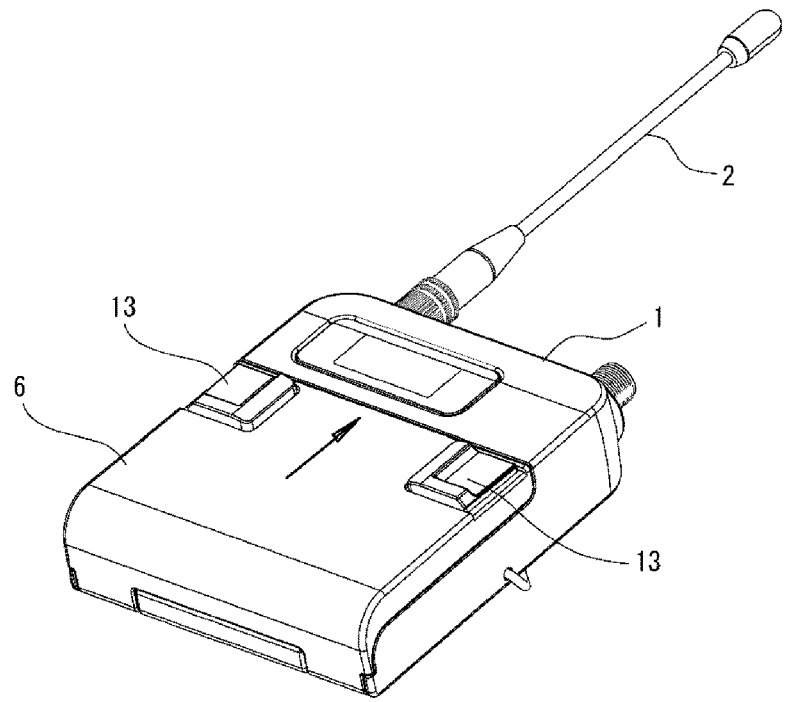
FIG. 4 is a perspective view illustrating the electronic device in a state where the opening and closing lid is slid upward in a state illustrated in FIG. 3.

Accordingly, as illustrated in FIG. 4, the opening and closing lid 6 can be slid upward.

Figure 8A:
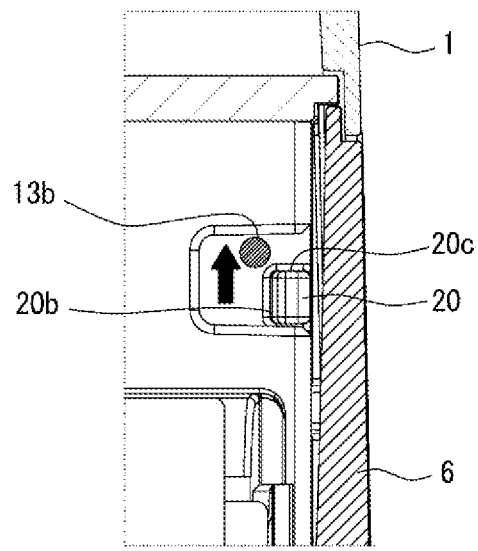
FIG. 8A to 8C is a sectional view illustrating the principal part in a third phase in the same way viewed from three viewpoints.
Figure 8B:
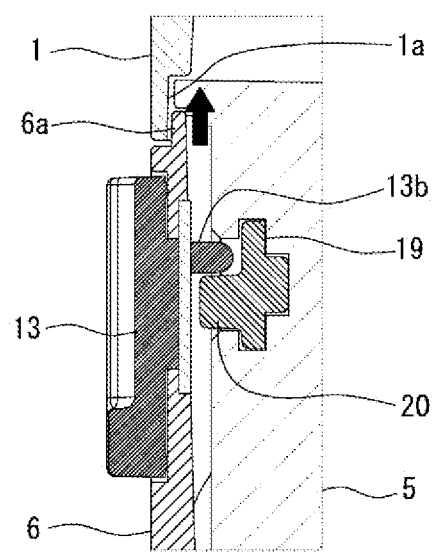
Figure 8C:
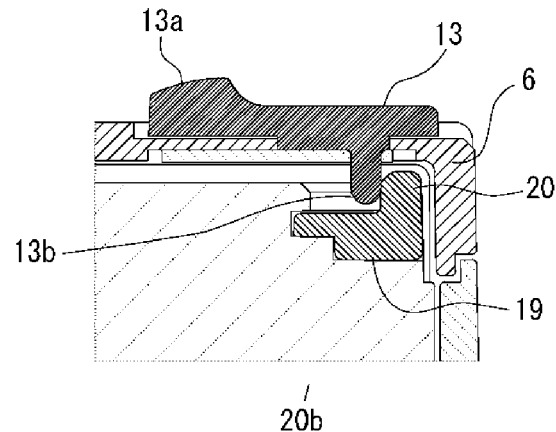

As illustrated in FIG. 4, when the opening and closing lid 6 is slid upward, for example, as illustrated in FIG. 8B, the thin step portion 6a formed linearly on the upper end portion of the opening and closing lid 6 enters into an inner surface (locking portion) 1a of top portion opening edge formed on the main body case 1 side. Accordingly, release of the opening and closing lid 6 is blocked.

At this time, the projection pin 13b of the unlocking knob 13 attached to the opening and closing lid 6 is also slid upward and is moved to a position denoted by an arrow mark in FIG. 8A.

Figure 9A:
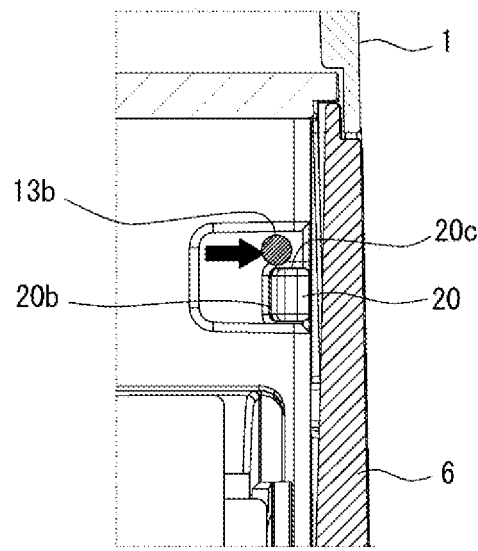
FIG. 9A to 9C is a sectional view illustrating the principal part in a state where the opening and closing lid is locked from three viewpoints.
Figure 9B:
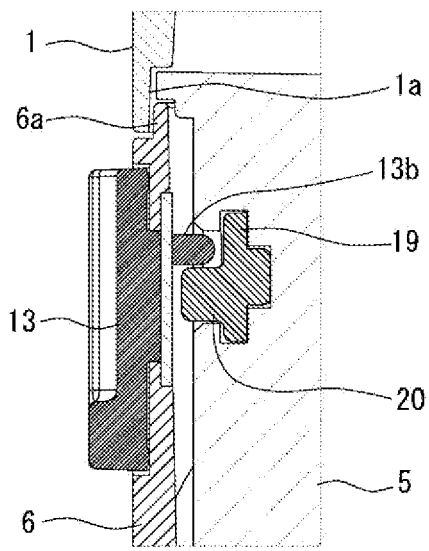
Figure 9C:
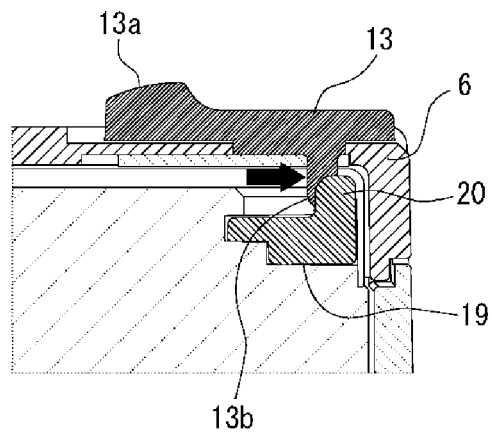

When the projection pin 13b of the unlocking knob 13 moves to a position illustrated in FIG. 8A, the above-described coil spring 17 that energizes the unlocking knob 13 outward tries to return to a steady state. Due to this function, the projection pin 13b of the unlocking knob 13, as denoted by an arrow mark in FIGS. 9A and 9C, is moved along a second side surface 20c formed in the prism-shaped protrusion 20.

That is, the projection pin 13b formed on the back surface of the unlocking knob 13 moves along the first and the second side surfaces 20b to 20c, which are two orthogonal side surfaces of the prism-shaped protrusion 20.

Figure 5:
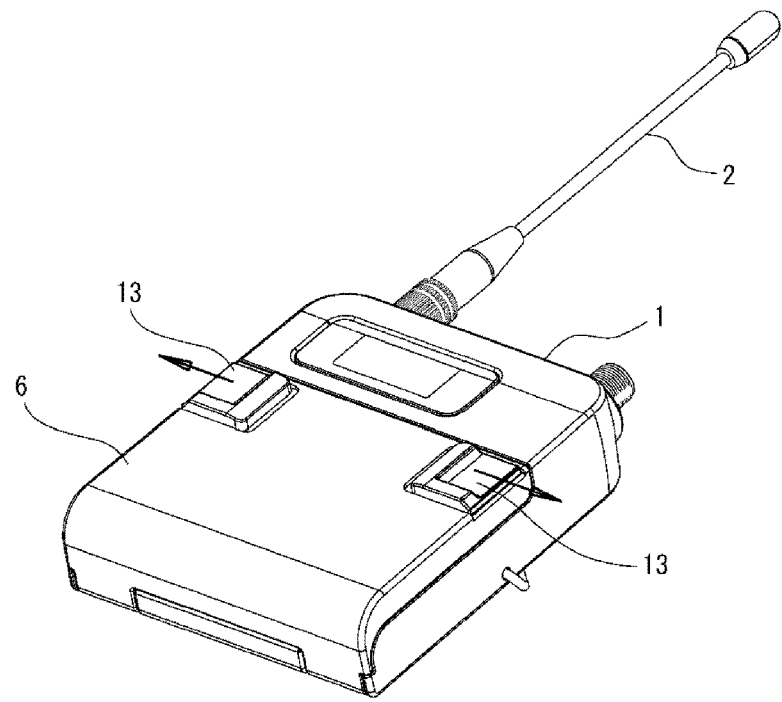
FIG. 5 is a perspective view illustrating the electronic device in a state where the opening and closing lid is locked.

As a result, by a function of the coil spring 17, the pair of unlocking knobs 13 moves toward a position both outsides of the opening and closing lid 6 as illustrated in FIG. 5.

Accordingly, the projection pin 13b formed on the back surface of the unlocking knob 13 positions facingly to the second side surface 20c of the prism-shaped protrusion 20.

Accordingly, the opening and closing lid 6 cannot make sliding operation downward, whereby the opening and closing lid 6 is held in the locked state.

As described above, in a case where the opening and closing lid 6 is closed and locked, as illustrated in FIG. 3, the opening and closing lid 6 is lightly pushed in a state where the opening and closing lid 6 is closed. In this state, by sliding the opening and closing lid 6 upward as illustrated in FIG. 4, the opening and closing lid 6 is in the locked state.

To open the opening and closing lid 6 in the locked state, the pair of unlocking knobs 13 attached to the opening and closing lid 6 is slid mutually inward. By sliding the opening and closing lid 6 downward in this state, the locked state of the opening and closing lid 6 is released. Then, the opening and closing lid 6 can be released by rotating the free end portion side of the opening and closing lid 6 to front centering on the spindle 8.

Figure 10:
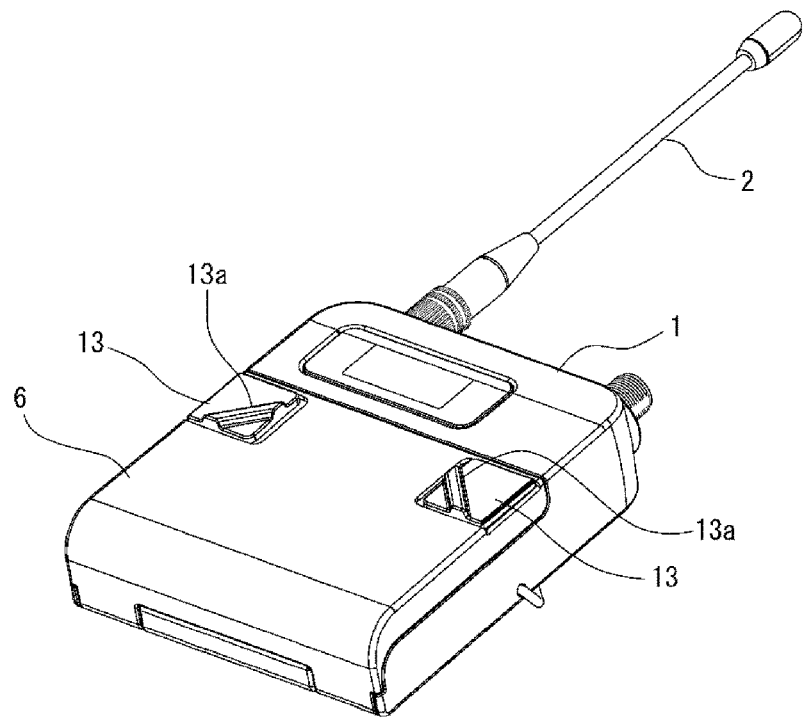
FIG. 10 is a perspective view of an electronic device illustrating another example of an unlocking knob.
Figure 11:
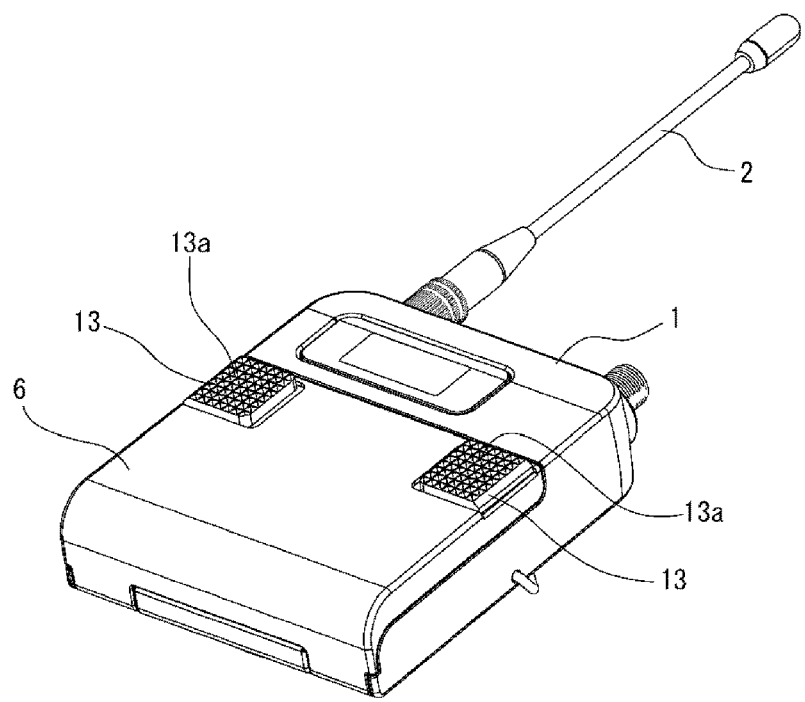
FIG. 11 is a perspective view of the electronic device illustrating still another example of the unlocking knob.

In this embodiment, the configuration has been described in which the protrusion 13a is arranged so as to form the L shape. However, the protrusion 13a is not limited to the L shape. For example, the protrusion 13a may also form the cross. Furthermore, two protrusions constituted a part to be a finger hook; however, as illustrated in FIG. 10, for example, the finger hook may also be constituted of one tilted linear protrusion that tilts outward from the center of the case 1, or in other words, that tilts outward in the sliding direction of the unlocking knob. The shape of the protrusion 13a may also be, in addition to the above-described one, a plurality of fine projected and recessed protrusions as illustrated in FIG. 11 may also be used. It may also be the L shape, the cross, or the tilted line, as described above, formed of fine projections and recesses.

With the locking device for the opening and closing lid according to the present invention, relatively simple and good operability is provided to locking operation and unlocking operation of the opening and closing lid.

Then, in releasing the locked state of the opening and closing lid, sliding operation in a transverse direction of the pair of unlocking knobs and sliding operation in a longitudinal direction of the opening and closing lid are accompanied, whereby such as the problem in that locking of the opening and closing lid is carelessly disengaged during use of an electronic device may be resolved, it is possible to obtain an act and effect as described in "Advantageous Effects of Invention".

What is claimed is:

1. A locking device comprising:
    a lid supported to be openable and closable by a spindle at one end portion thereof and slidably attached to one side surface of a main body case in a direction orthogonal to a length direction of the spindle;
    a pair of unlocking knobs slidably arranged along a front surface of the lid; and
    a locking portion formed on a main body case side and configured to set the lid in a locked state by locking a free end portion side of the lid by sliding the lid in one direction in a state where the lid is closed, wherein
    by sliding the pair of unlocking knobs in the locked state of the lid, a sliding operation of the lid in another direction is enabled to unlock the lid,
    on a back side of each of the pair of unlocking knobs in a state where the lid is closed, a knob guide provided with a prism-shaped protrusion is arranged on the main body case side,
    a projection pin is formed so as to project from a back surface of each of the pair of unlocking knobs, and a side surface of the projection pin of each of the pair of unlocking knobs is configured to position along any one of two orthogonal side surfaces of the prism-shaped protrusion formed in each of the knob guides, and
    the sliding operation of the lid is enabled when each of the projection pins is positioned along a first side surface of the prism-shaped protrusion, and the sliding operation is disabled when each of the projection pins is positioned along a second side surface of the prism-shaped protrusion.

2. The locking device according to claim 1, wherein
    in a case where the lid is closed, a tip portion of each of the projection pins projecting on each of the back surfaces of the pair of the unlocking knobs abuts a tip portion of the prism-shaped protrusion provided on each of the knob guides, and
    a tilted surface where the projection pin of the unlocking knob is dropped along the first side surface of the prism-shaped protrusion is formed in the tip portion of the prism-shaped protrusion provided on each of the knob guides.

* * * * *